(12) United States Patent
Li et al.

(10) Patent No.: US 10,431,114 B2
(45) Date of Patent: Oct. 1, 2019

(54) OCEANEERING TEST PLATFORM DEVICE FOR SIMULATING OCEANEERING WORKING CONDITIONS

(71) Applicant: Zhejiang Ocean University, Zhoushan (CN)

(72) Inventors: Detang Li, Zhoushan (CN); Yubin Fan, Zhoushan (CN); Yonghe Xie, Zhoushan (CN); Wei Lin, Zhoushan (CN); Quanliang Liu, Zhoushan (CN); Qingli Ma, Zhoushan (CN); Xiaojun Zhang, Zhoushan (CN); Wenjing Liu, Zhoushan (CN); Yungang Wu, Zhoushan (CN); Zhaode Zhang, Zhoushan (CN); Xiaolong Dong, Zhoushan (CN); Minghui Liu, Zhoushan (CN); Zhiguo Sun, Zhoushan (CN); Jingguang Sun, Zhoushan (CN); Mingdong Zhang, Zhoushan (CN); Wei Wang, Zhoushan (CN); Zhengshou Chen, Zhoushan (CN); Xinglan Bai, Zhoushan (CN); Lijun Wang Wang, Zhoushan (CN); Junlai Li, Zhoushan (CN); Jian Li, Zhoushan (CN); Lei Li, Zhoushan (CN)

(73) Assignee: Zhejiang Ocean University, Zhoushan (CN)

( * ) Notice: Subject to any disclaimer, the term of this patent is extended or adjusted under 35 U.S.C. 154(b) by 123 days.

(21) Appl. No.: 15/361,507

(22) Filed: Nov. 28, 2016

(65) Prior Publication Data

US 2018/0108270 A1 Apr. 19, 2018

(30) Foreign Application Priority Data

Oct. 18, 2016 (CN) .......................... 2016 1 0905987

(51) Int. Cl.
*G09B 19/00* (2006.01)
*G09B 25/02* (2006.01)

(52) U.S. Cl.
CPC ............. *G09B 19/00* (2013.01); *G09B 25/02* (2013.01)

(58) Field of Classification Search
CPC ....... B63B 27/12; B63G 8/001; E02B 17/021; E02B 17/06; E02B 17/0818;
(Continued)

(56) References Cited

U.S. PATENT DOCUMENTS 3,791,628 A * 2/1974 Burns ...................... B66D 1/48
254/277
3,848,669 A * 11/1974 Brown ................ E21B 33/0415
166/334.1

(Continued)

*Primary Examiner* — Michael C Grant
(74) *Attorney, Agent, or Firm* — Gokalp Bayramoglu

(57) ABSTRACT

An oceaneering test platform device for simulating oceaneering working conditions is disclosed. The oceaneering test platform device comprises a main body, a lifting unit, a plurality of spud legs connected to the main body by the lifting unit, a plurality of base units located correspondingly to the plurality of spud legs and one or more vertical driving unit to enable vertical movement of at least one of the plurality of spud legs. The test platform device facilitates simulation of possible effects caused by unstable and complex ocean environments to an offshore work platform.

12 Claims, 7 Drawing Sheets

(58) Field of Classification Search
CPC .. E02B 2017/0082; F01C 1/103; F01C 9/002; F01C 13/00; F01C 13/16; F03B 13/16; F03B 13/1885; F03B 13/20; F03B 13/22; F03G 7/08; F05B 2240/93; F17C 2265/07; F17C 2270/0581; G09B 19/00; G09B 25/02

USPC .......................................................... 434/219

See application file for complete search history.

(56) References Cited

U.S. PATENT DOCUMENTS

| | | | | | |
|---|---|---|---|---|---|
| 3,905,580 | A * | 9/1975 | Hooper | ............... | E21B 19/09 175/27 |
| 4,422,802 | A * | 12/1983 | Choate | ............... | E02B 17/021 405/196 |
| 4,431,345 | A * | 2/1984 | Inoue | ............... | E02B 17/00 405/195.1 |
| 5,154,561 | A * | 10/1992 | Lee | ............... | B63B 27/12 114/264 |
| 5,219,315 | A * | 6/1993 | Fuller | ............... | A63G 3/00 348/124 |
| 5,282,772 | A * | 2/1994 | Ninomiya | ............... | A63G 31/007 104/73 |
| 5,522,680 | A * | 6/1996 | Hoss | ............... | E02B 17/00 405/195.1 |
| 5,833,396 | A * | 11/1998 | Thomas | ............... | E02B 17/021 405/198 |
| 5,906,457 | A * | 5/1999 | Choate | ............... | E02B 17/06 254/112 |
| 8,841,786 | B2 * | 9/2014 | Tucker | ............... | F01C 1/103 290/1 R |
| 9,610,511 | B1 * | 4/2017 | Francis | ............... | B60K 17/30 |
| 9,981,194 | B1 * | 5/2018 | Jennings | ............... | A63G 31/02 |
| 10,060,408 | B2 * | 8/2018 | Vamvas | ............... | F03B 13/22 |
| 2005/0109537 | A1 * | 5/2005 | Ayling | ............... | E21B 7/124 175/5 |
| 2006/0062636 | A1 * | 3/2006 | Bennett, Jr. | ............... | E02B 17/021 405/198 |
| 2006/0256653 | A1 * | 11/2006 | Toennessen | ............... | G01V 1/3826 367/16 |
| 2007/0126239 | A1 * | 6/2007 | Stewart | ............... | F03B 13/20 290/53 |
| 2009/0090166 | A1 * | 4/2009 | Talley | ............... | G01N 3/303 73/12.06 |
| 2010/0147528 | A1 * | 6/2010 | Baugh | ............... | E21B 19/004 166/355 |
| 2012/0183359 | A1 * | 7/2012 | Nordstrom | ............... | B63B 35/003 405/205 |
| 2013/0002056 | A1 * | 1/2013 | Nair | ............... | F03B 13/1885 310/26 |
| 2013/0269953 | A1 * | 10/2013 | Burns | ............... | E21B 15/003 166/377 |
| 2014/0205383 | A1 * | 7/2014 | Noble | ............... | E02B 17/0021 405/196 |
| 2014/0261092 | A1 * | 9/2014 | Sywak | ............... | F16M 11/18 108/4 |
| 2014/0261132 | A1 * | 9/2014 | Zeren | ............... | B63G 8/001 114/257 |
| 2015/0354164 | A1 * | 12/2015 | Kok Seng | ............... | E02D 27/525 405/224 |
| 2015/0354748 | A1 * | 12/2015 | Kang | ............... | A63G 31/16 248/371 |
| 2016/0116376 | A1 * | 4/2016 | Roodenburg | ............... | E21B 19/143 73/865.6 |
| 2016/0148526 | A1 * | 5/2016 | Morris | ............... | G09B 9/04 434/62 |
| 2016/0167224 | A1 * | 6/2016 | Foster | ............... | B25J 9/123 318/601 |
| 2016/0169188 | A1 * | 6/2016 | Dick | ............... | F03B 31/24 290/53 |
| 2016/0334793 | A1 * | 11/2016 | Celikkol | ............... | G01C 21/20 |
| 2017/0009734 | A1 * | 1/2017 | Vamvas | ............... | F03B 13/22 |
| 2017/0072327 | A1 * | 3/2017 | Wach | ............... | A63G 31/16 |
| 2017/0113150 | A1 * | 4/2017 | Lee | ............... | A63F 13/28 |
| 2017/0146765 | A1 * | 5/2017 | Lambertus | ............... | H04B 10/0775 |
| 2017/0148338 | A1 * | 5/2017 | So | ............... | G09B 9/00 |
| 2018/0075769 | A1 * | 3/2018 | Mar | ............... | G09B 9/04 |
| 2018/0087484 | A1 * | 3/2018 | Schurtenberger | ............... | F03B 11/02 |

* cited by examiner

OCEANEERING TEST PLATFORM DEVICE FOR SIMULATING OCEANEERING WORKING CONDITIONS

CROSS REFERENCE TO RELATED APPLICATIONS

This application claims priority to Chinese Patent Application No. 201610905987.0, filed on Oct. 18, 2016, the entire contents of which are incorporated herein by reference.

TECHNICAL FIELD

The present disclosure relates to the field of oceaneering, and more particularly to a test platform device for simulation oceaneering working conditions.

BACKGROUND

An offshore work platform mainly consists of a platform main body, multiple spud legs, a work system and a lift system. The work process involved in an offshore work platform usually include offshore towing deployment, offshore work platform positioning, seabed supporting of spud legs, lifting of the platform main body and well drilling.

The offshore work platform would not leave sea level until the spud legs have done finding supporting ground at seabed. Due to the sea waves, the spud legs are likely to become subject to foundation loosening or collapsing as they extend into the seabed to set up the foundation. Besides, seabed supporting of spud legs and lifting of the platform main body take a long time to complete. For the above reasons, an offshore work platform is usually exposed to many problems during similar installation processes.

Moreover, the safety measurements of an offshore work platform may be influenced by weather, waves and geological sinking. Complex security situations are expected at sea. Since an offshore work platform is located far away from shore, real-time rescue from land may prove difficult in case of a disaster.

For prevention of accidents, it is beneficial to improve the operators' skills required when performing installation of the spud legs into seabed. Training the operators for emergency situations during a disaster would also contribute substantially to reducing disaster losses. However, there is not yet a simulated lifting platform to train operators to manipulate offshore work platforms. Operators use field platforms to train the operations in prior arts. Such measurements would play a negative role in training the operators to master the platform, and bring about serious potential security problems.

BRIEF DESCRIPTION OF THE DRAWINGS

The present disclosure is illustrated by way of examples and is not limited by the accompanying drawings, in which similar reference numbers indicate similar elements, and in which.

REFERENCE NUMBERS 1. main body; 2. spud leg; 3. hydraulic cylinder; 4. base unit; 5. pipe; 6. guiding sleeve; 7. slider; 8. oil cylinder; 9. wave damping signal generator; 10. rack; 11. pinion; 12. two-way hydraulic motor; 13. hydraulic fluid chamber; 14. secure valve; 15. reversing valve; 16. cushion valve; 17. stand; 18. first spud leg part; 19. second spud leg part; 20. third spud leg part; 21. first sliding rail; 23. first driving cylinder; 22. first sliding part; 24. second sliding rail; 25. second sliding part; 26. second driving cylinder; 27. mounting stage; 28. operation chamber; 29. speed control valve; 30. rolling wheel; 31. holder; 32. irregularly shaped cam; 33. energy storage

DETAILED DESCRIPTION

Various aspects of the illustrative embodiments of the present disclosure will be described herein using terms commonly employed by those skilled in the art. However, it will be apparent to those skilled in the art that alternate embodiments may be practiced with only some of the described aspects. For purposes of explanation, specific numbers, materials and configurations are set forth in order to provide a thorough understanding of the illustrative embodiments. It will be apparent that alternate embodiments may be practiced without the specific details. In other instances, well-known features are omitted or simplified in order not to obscure the illustrative embodiments.

It will be understood that, although the terms "first", "second", "third", etc. may be used herein to describe various elements, these elements should not be limited by these terms to indicate or imply any relative importance. These terms are only used to distinguish one element from another. For example, a first element could be termed a second element without departing from the scope of the present disclosure. The terms "center", "upper", "lower", "left", "right". "vertical", "lateral", "inner". "outer", etc. may indicate directions or positions as illustrated in some of the drawings. These terms are only used in order not to obscure the description, and should not be construed as an indication of a particular position relation or sequence. As used herein, the term "and/or" includes any and all combinations of one or more of the associated listed items. The terms "connected", "coupled" or any variant thereof means any connection or coupling either direct or indirect between two or more elements. Such a coupling or connection between the elements can be physical, electrical, logical or a combination thereof.

Figure 1:
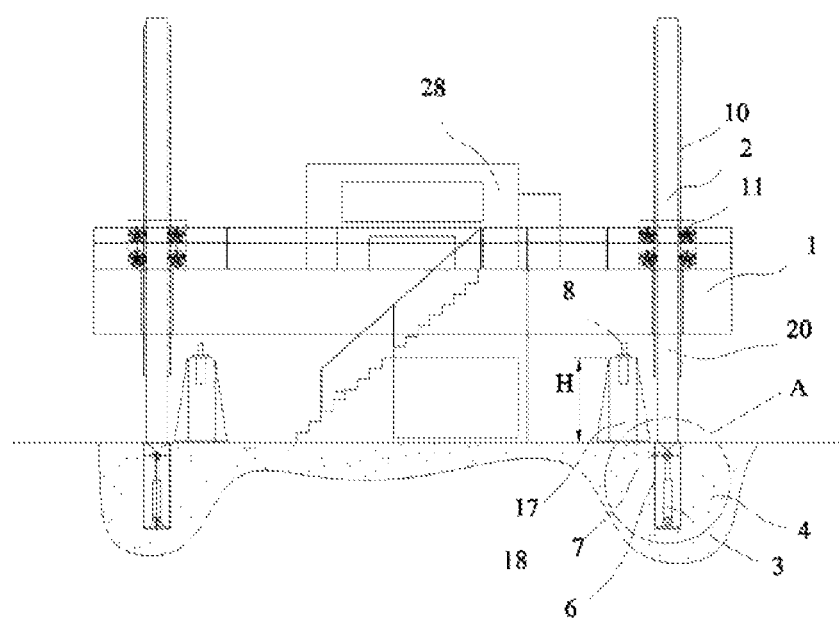
FIG. 1 illustrates the structure of an offshore oceaneering test platform device according to an embodiment.
Figure 2:
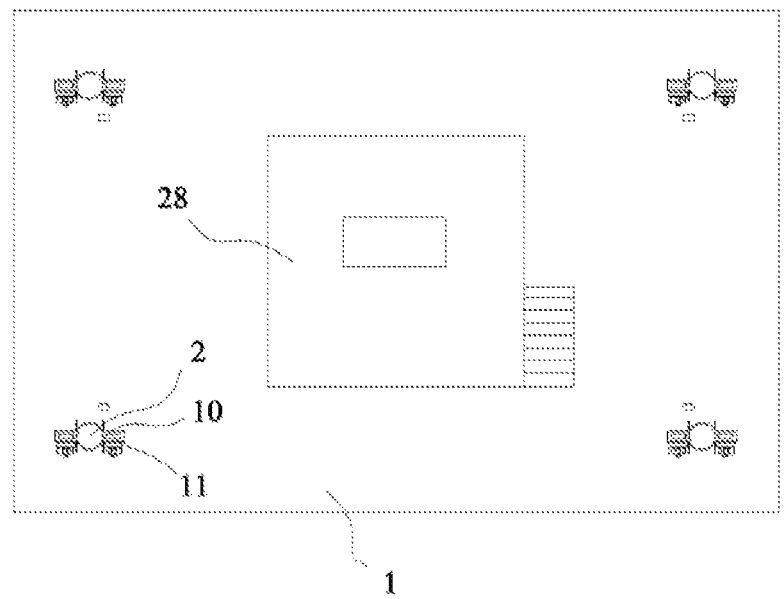
FIG. 2 illustrates a top view of the test platform device as illustrated in FIG. 1 according to an embodiment.
Figure 6:
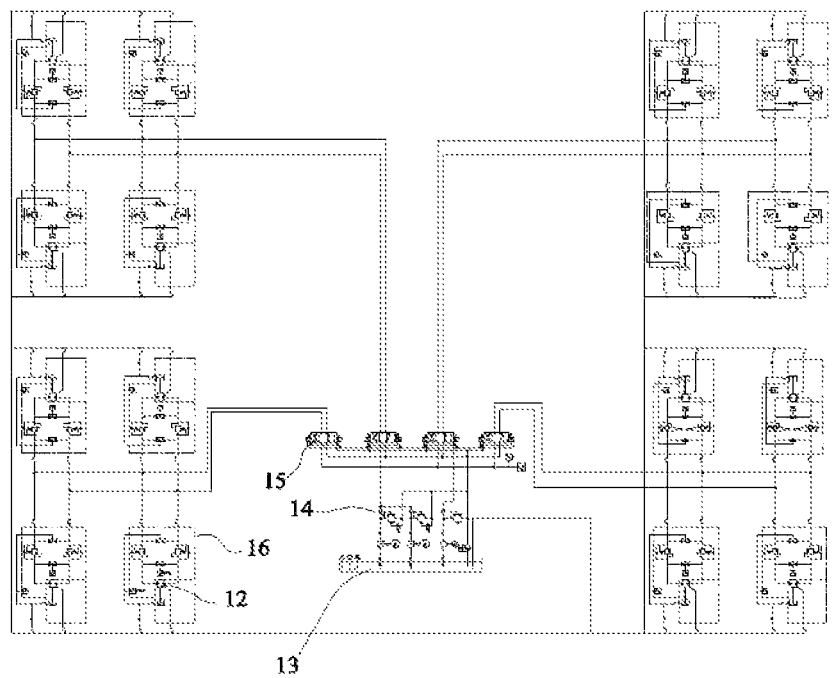
FIG. 6 illustrates the hydraulic control system of an oceaneering test platform device according to another embodiment.

As shown in FIGS. 1 and 2, an exemplary oceaneering test platform device for simulating oceaneering working conditions comprises a main body 1 and a plurality of spud legs 2 to support the main body 1. The plurality of spud legs 2 are connected to the main body by a lifting unit which enables vertical movements. In particular, the illustrated embodiment shows a total of four spud legs, but there could be more or less spud legs. The lifting unit comprises a plurality of racks 10 secured to the outer walls of the spud legs 2, and a plurality of pinions 11 rotationally connected to the main body 1. The lifting unit also contains a pinion driving system to actuate the pinions 11. The racks 10 engage with corresponding pinions 11. In some embodiments, each spud leg 2 comprises two racks 10 on its side wall, and each rack 10 engages with two corresponding pinions 11. The pinion driving system may comprise a two-way hydraulic motor 12 and a hydraulic fluid chamber 13. The driving end of the two-way hydraulic motor 12 is drivably connected to the pinions 11. The two-way hydraulic motor 12 is also attached to the hydraulic fluid chamber 13 through, for example, a hydraulic controller. The oceaneering test platform device further comprises one or more vertical driving unit to enable vertical movements of at least one of the plurality of spud legs 2. The vertical driving unit has one end fixed or hinged to a base unit 4 located correspondingly to a spud leg 2. The number of base units 4 equals to the number of spud legs 2. Therefore, one spud leg 2 is located on the top of the vertical driving unit. In some embodiments, the base unit 4 is implemented as a concrete casted foundation. The main body 1 contains an operation chamber 28 in the center. The operation chamber 28 contains a master controller to control the motion of the main body 1 relative to each spud leg 2. The master controller can employ the master controlling system of a prior art offshore drilling platform to imitate a real platform. FIG. 6 illustrates an example of the pinion driving system. The pinion driving system also comprises a secure valve 14, a reversing valve 15 and a cushion valve 16 in serial connection. The secure valve 14 is connected to the hydraulic fluid chamber 13. The cushion valve 16 is connected to the two-way hydraulic motor 12. Alternatively, the pinion driving system can comprises a servo motor drivably connected to the pinions 11. In some embodiments, each spud leg 2 is connected to a vertical driving unit. One or more vertical driving units are not located at the same horizontal plane, such that the operator may choose any one vertical driving unit or multiple different vertical driving units to simulate various geological characteristics. Having the vertical driving units on different horizontal planes would also bring closer resemblance to real geomorphology, which could be rough.

Figure 3:
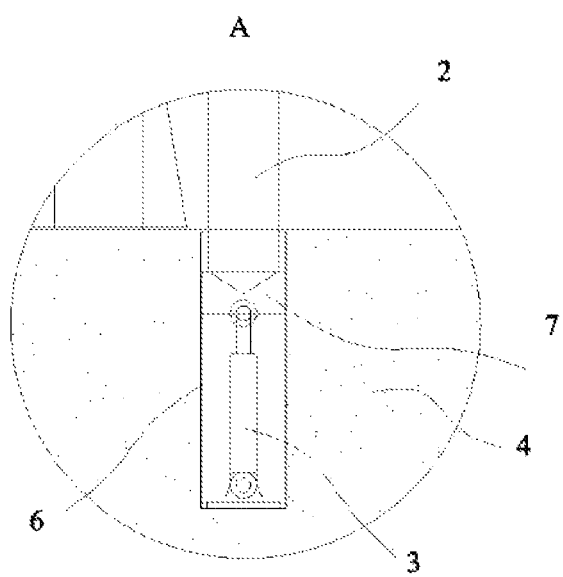
FIG. 3 illustrates an enlarged view of the part A of the test platform device as illustrated in FIG. 1 according to an embodiment.

As seen in FIG. 3, the vertical driving unit is a hydraulic cylinder 3. Each base unit 4 comprises a mounting socket to receive one vertical driving unit 3 and at least a part of a corresponding spud leg 2. One end of the hydraulic cylinder 3 is fixed or hinged to the base unit 4. In some embodiments, the mounting socket comprises a guiding sleeve 6 installed vertically inside. The spud leg has a slider 7 at the end received in the mounting socket. The slider 7 can move vertically in the guiding sleeve 6. The other end, i.e., the driving end connects to the slider 7 in a fixed or hinged fashion. The guiding sleeve 6 may be manufactures with metallic materials such as steel, so it would enhance the strength of the base unit while performing guiding movements. In some embodiments, the hydraulic cylinder 3 is in sliding connection with the base unit 4, and the driving end of the hydraulic cylinder 3 is hinged to the slider 7. This configuration would prevent damage to the hydraulic cylinder 3 due to excessive external force since the hydraulic cylinder 3 has a rotating degree of freedom without being fixed. In the case of excessive external force, the hydraulic cylinder 3 may rotate a certain degree to adapt.

Figure 4:
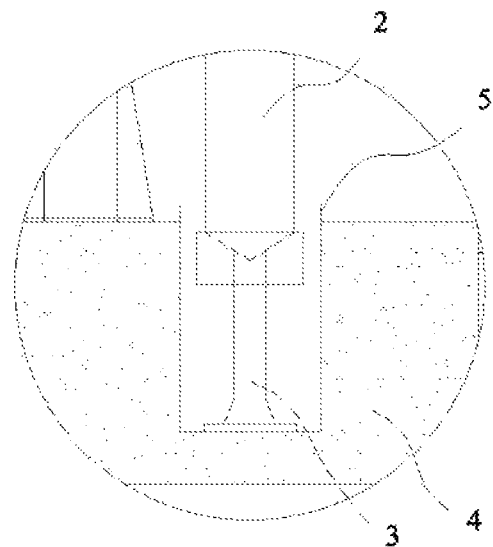
FIG. 4 illustrates the structure of a power unit of an exemplary oceaneering test platform device according to an embodiment.

As seen in FIG. 4, the vertical driving unit is also the hydraulic cylinder 3. There might be a pipe 5 installed vertically inside the base unit 4 according to an alternate embodiment. The lower end of the pipe 5 is fixed to the base unit 4 through the mounting socket. The upper end of the pipe 5 extends above the base unit 4. The hydraulic cylinder 3 extends through the pipe with its driving end connected to one spud leg 2. The pipe 5 increases the strength of the foundation and offers protection to the spud leg 2. This configuration guarantees a table axial output force for the hydraulic cylinder 3, in order to simulate the effects of geological conditions on the spud leg 2.

Figure 7:
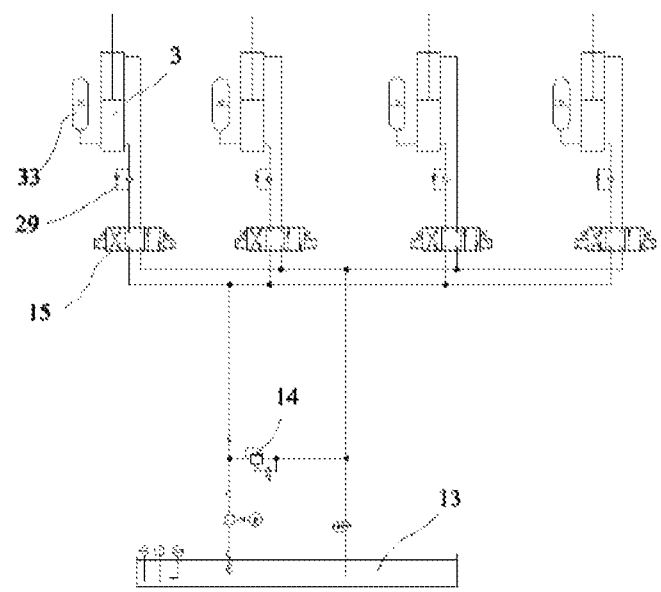
FIG. 7 illustrates the power unit of an oceaneering test platform device according to another embodiment.

FIG. 7 illustrates the hydraulic layout of a power unit according to some embodiments. The hydraulic cylinder 3 connects to a speed control valve 29, the reversing valve 15, the secure valve 14 and the hydraulic fluid chamber 13 in sequence through pipeline. There is an energy storage 33 between the hydraulic cylinder 3 and the speed control valve 29. The energy storage further improves the stability of the hydraulic cylinder.

Figure 5:
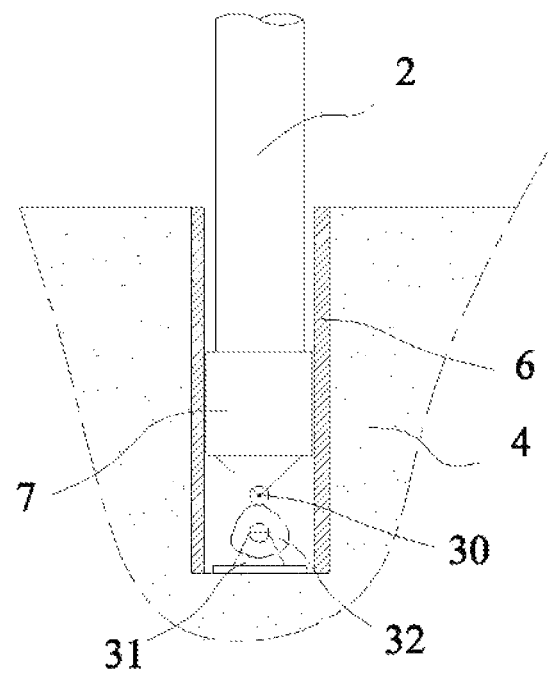
FIG. 5 illustrates the structure of a power unit of an exemplary oceaneering test platform device according to another embodiment.

As seen in FIG. 5, a guiding sleeve 6 is installed vertically inside a base unit 4 corresponding to a spud leg 2 which is connected to a vertical driving unit. A slider 7 is fixedly attached to a bottom of the spud leg 2 which is connected to a vertical driving unit, and the slider 7 moves within the guiding sleeve 6. A rolling wheel 30 is rotatably connected to the bottom of the slider 7. A holder 31 is fixed to the base unit 4 through the guiding sleeve 6. An irregularly shaped cam 32 is rotatably connected to the holder 31. The irregularly shaped cam 32 is also connected to the rolling wheel 30 and a motor to enable its rotation. The outer surface of the irregularly shaped cam 32 is an irregular curved surface, so the rolling wheel 30 can rotate in response to the rotation of the irregularly shaped cam 32. The rolling wheel 30 keeps in contact with the irregularly shaped cam 32 due to gravity. Effects of geological conditions on the spud leg 2 can be simulated by driving the spud leg 2 to move vertically.

The oceaneering test platform device further comprises a plurality of wave damping simulation units. Each wave damping simulation unit is fixed to an area within the vertical projection of the main body 1 in the foundation. The wave damping simulation units are used to waggle the main body 1 when contacting the main body 1. In some embodiments, a wave damping simulation unit comprises a plurality of oil cylinders 8 and a wave damping signal generator 9 to actuate the plurality of oil cylinders 8. Stands 17 are disposed on top of the base unit 4. The plurality of oil cylinders 8 are fixed to the stands 17 with their driving ends facing upwards. In an example embodiment comprising four oil cylinders 8, each oil cylinder 8 corresponds to a stand 17. The four stands 17 are disposed around the four corners of the main body 1. Oil cylinders 8 are coupled to the wave damping signal generator 9.

Figure 8:
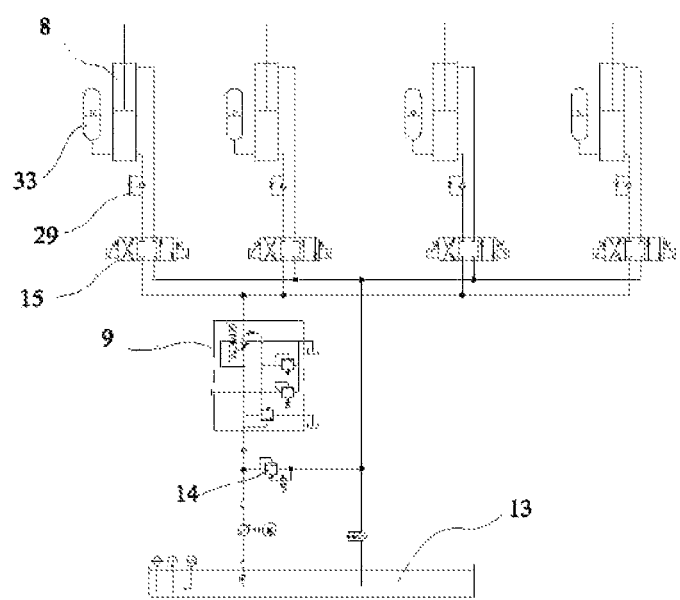
FIG. 8 illustrates the wave damping simulation unit of an oceaneering test platform device according to another embodiment.

FIG. 8 illustrates the wave damping simulation unit. Oil cylinders 8 are in turn connected to the speed control valve 29, the reversing valve 15, the wave damping signal generator 9, the secure valve 14 and the hydraulic fluid chamber 13 by pipeline. An energy storage may also be connected between the oil cylinders 8 and a single-direction balancing valve to improve the reliability of oil cylinders 8.

Figure 9:
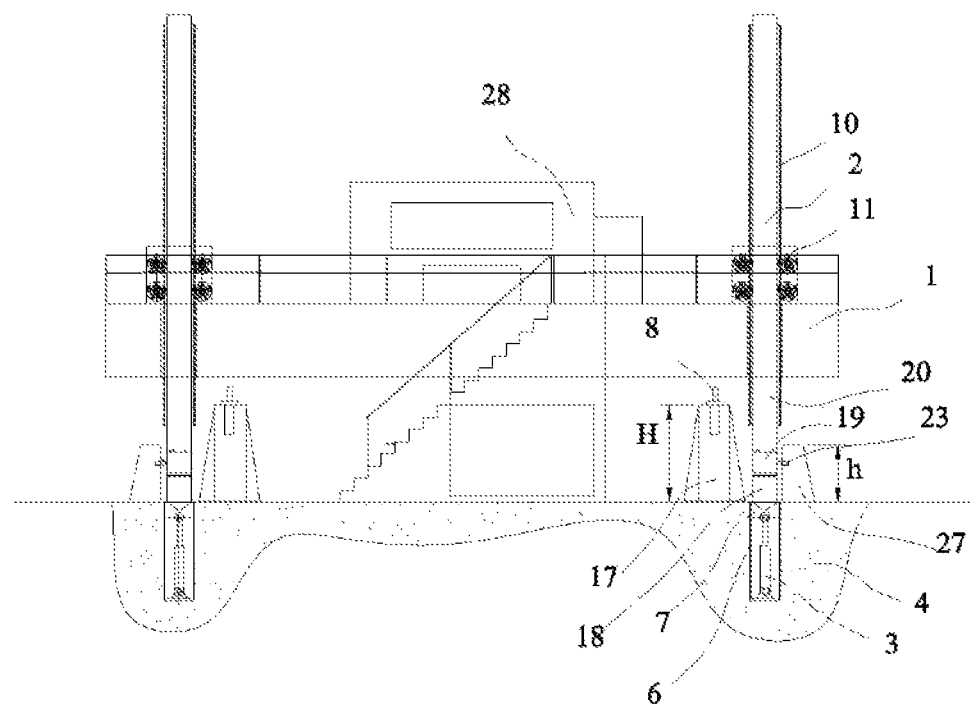
FIG. 9 illustrates the oceaneering test platform device equipped with a lateral driving unit according to another embodiment.
Figure 10:
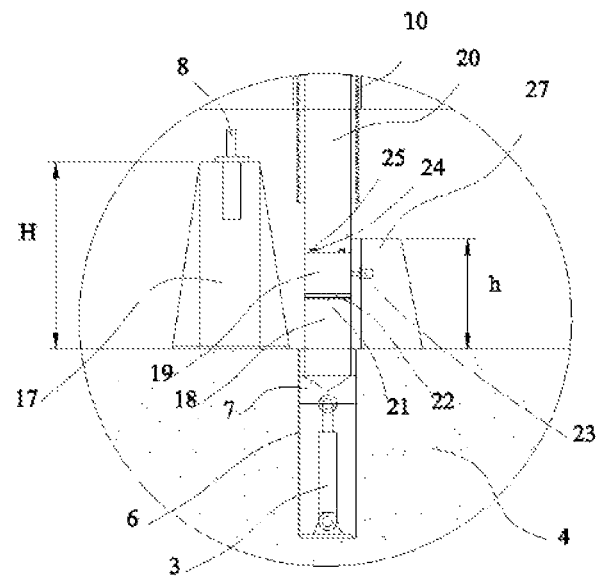
FIG. 10 illustrates the lower end of a spud leg of the oceaneering test platform device equipped with a lateral driving unit according to another embodiment.
Figure 11:
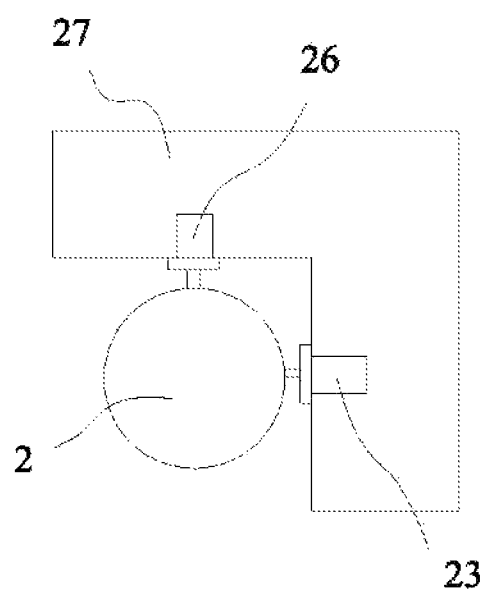
FIG. 11 illustrates the mounting stage of the oceaneering test platform device equipped with a lateral driving unit according to another embodiment.

As shown in the embodiments of FIGS. 9-11, each spud leg 2 further comprises a lateral driving unit including a first driving part and second driving part. The spud leg 2 comprises a first spud leg part 18, a second spud leg part 19 and a third spud leg part 20. The first driving part comprises a first sliding rail 21, a first sliding part 22 and a first driving cylinder 23, and the second driving part comprises a second sliding rail 24, a second sliding part 25 and a second driving cylinder 26. The first sliding rail 21 is fixed to the upper end of the first spud leg part, the first sliding part 22 is fixed to the lower end of the second spud leg part, and the first driving cylinder 23 is fixed to the center of the second spud leg part. Similarly, the second sliding rail 24 is fixed to the upper end of the second spud leg part, the second sliding part 25 is fixed to the lower end of the third spud leg part, and the second driving cylinder 26 is fixed to the center of the third spud leg part. The first driving part enables lateral displacements in a first direction and the second driving part enables displacements in a second direction being perpendicular to the first direction. A mounting stage 27 is disposed on top of the base unit 4. Both the first and second driving cylinders 23 and 26 are hinged to the mounting stage 27. The height of the mounting stage 27 is less than the height H of the stand 17, such that the main body 1 would be enabled to first contact the wave damping simulation unit when descending. Therefore, the distance between the lower end of the third spud leg part and the base unit 4 is less than the height of the stand 17.

During a training using the platform as described above, an operator would enter the operation chamber and activate the vertical driving units. The vertical driving units drive corresponding spud legs 2 to move vertically according to various recorded geological conditions. The vertical driving units could act separately or as a whole, based on pre-programmed actions. When simulating the effects of sea waves on the platform, the operator will activate the wave damping simulation unit to drive the main body 1 with the oil cylinders 8. When simulating the effects of sea waves on the spud legs 2 after the main body 1 has left sea level, the operator would active the lateral driving units to drive the spud legs 2. Two or more actions described above can also be performed simultaneously to simulate complex environment at sea.

The following examples pertain to further embodiments:

In one example, an oceaneering test platform device for simulating oceaneering working conditions is disclosed which comprises a main body; a lifting unit comprising a plurality of racks secured to the outer walls of the spud legs and a plurality of pinions rotationally connected to the main body; a plurality of spud legs connected to the main body by the lifting unit; a plurality of base units located correspondingly to the plurality of spud legs and one or more vertical driving unit to enable vertical movement of at least one of the plurality of spud legs.

In a further example, the vertical driving unit comprises a hydraulic cylinder with one end fixed or hinged to the base unit.

In a still further example, each base unit comprises a mounting socket to receive one vertical driving unit and at least a part of a corresponding spud leg.

In a still further example, the mounting socket comprises a guiding sleeve installed vertically inside, the spud leg comprises at one end a slider to move within the guiding sleeve, and the other end of the hydraulic cylinder is connected to the slider.

In a still further example, the mounting socket comprises a pipe installed vertically inside, the hydraulic cylinder extends through the pipe, and the other end of the hydraulic cylinder is connected to the spud leg.

In a still further example, the one or more vertical driving units are not located at the same horizontal plane.

In a still further example, a plurality of wave damping simulation units are also included. Each wave damping simulation unit comprises a stand disposed on top of the base unit, a plurality of oil cylinders fixed to the stand and a wave damping simulation signal generator to actuate the plurality of oil cylinders.

In a still further example, the wave damping simulation signal generator is configured to actuate the plurality of oil cylinders to waggle the main body when the main body contacts with the plurality of oil cylinders.

In a still further example, each spud leg further comprises a lateral driving unit including a first driving part and second driving part, the first driving part comprises a first sliding rail, a first sliding part and a first driving cylinder, and the second driving part comprises a second sliding rail, a second sliding part and a second driving cylinder.

In a still further example, the first sliding rail is fixed to the upper end of a first spud leg part, the first sliding part is fixed to the lower end of a second spud leg part, and the first driving cylinder is fixed to the center of the second spud leg part.

In a still further example, the second sliding rail is fixed to the upper end of the second spud leg part, the second sliding part is fixed to the lower end of a third spud leg part, and the second driving cylinder is fixed to the center of the third spud leg part.

In a still further example, the first driving part enables lateral displacement in a first direction and the second driving part enables displacement in a second direction being perpendicular to the first direction.

In a still further example, the first and second driving cylinders are hinged to a mounting stage disposed on top of the base unit, and the height of the mounting stage is less than that of the stand.

In a still further example, the distance between the lower end of the third spud leg part and the base unit is less than the height of the stand.

In a still further example, the lift unit further comprises a two-way hydraulic motor, a hydraulic fluid chamber and a hydraulic controller coupling the two-way hydraulic motor to the hydraulic fluid chamber, the two-way hydraulic motor being connected to the plurality of racks.

In a still further example, the hydraulic controller comprised a secure valve, a reversing valve and a cushion valve in serial connection. The secure valve is connected to the hydraulic fluid chamber and the cushion valve is connected to the two-way hydraulic motor.

The oceaneering test platform device can be used to simulate an offshore working platform in various situations, such as the situation when the platform raises from sea level leaving the spud legs to the impact of sea waves and a situation when the working platform is still floating at sea level as the spud legs are not yet completely inserted into sea bed. Such an oceaneering test platform device would enable a thorough simulation of an offshore work platform. Operators would be benefited from training with the test platform device and improve their manipulation skills involving promotion and demotion of an offshore work platform.

Although certain embodiments have been illustrated and described herein for purposes of description, a wide variety of alternate and/or equivalent embodiments or implementations calculated to achieve the same purposes may be substituted for the embodiments shown and described without departing from the scope of present disclosure. This application is intended to cover any adaptations or variations of the embodiments discussed herein. Therefore, it is manifestly intended that embodiments described herein be limited only by the claims and the equivalents thereof.

What is claimed is:

1. An oceaneering test platform device for simulating oceaneering working conditions, comprising:
   a main body;
   a plurality of spud legs connected to the main body by a lifting unit;
   the lifting unit, comprising a plurality of racks secured to outer walls of the plurality of spud legs, and a plurality of pinions rotationally connected to the main body;
   a plurality of base units located correspondingly to the plurality of spud legs;
   at least one vertical driving unit to enable vertical movements of at least one of the plurality of spud legs;
   wherein each base unit comprises a mounting socket to receive one vertical driving unit and at least a part of a corresponding spud leg;
   wherein the vertical driving unit is a hydraulic cylinder;
   wherein the mounting socket comprises a guiding sleeve installed vertically inside the mounting socket, a slider is fixedly attached to a bottom of the corresponding spud leg, the slider moves within the guiding sleeve, and another end of the hydraulic cylinder is connected to the slider.

2. An oceaneering test platform device for simulating oceaneering working conditions, comprising:
   a main body;
   a plurality of spud legs connected to the main body by a lifting unit;
   the lifting unit, comprising a plurality of racks secured to outer walls of the plurality of spud legs, and a plurality of pinions rotationally connected to the main body;
   a plurality of base units located correspondingly to the plurality of spud legs;
   at least one vertical driving unit to enable vertical movements of at least one of the plurality of spud legs;
   wherein each base unit comprises a mounting socket to receive one vertical driving unit and at least a part of a corresponding spud leg;
   wherein the vertical driving unit is a hydraulic cylinder;
   wherein the mounting socket comprises a pipe installed vertically inside the mounting socket, one end of the hydraulic cylinder extends through the pipe, and another end of the hydraulic cylinder is connected to the spud leg.

3. The oceaneering test platform device of claim 2, wherein the oceaneering test platform device includes at least two vertical driving units, which are not located at the same horizontal plane.

4. The oceaneering test platform device of claim 2, further comprising a plurality of wave damping simulation units, each wave damping simulation unit comprising a stand disposed on top of the base unit, a plurality of oil cylinders fixed to the stand and a wave damping simulation signal generator to actuate the plurality of oil cylinders.

5. The oceaneering test platform device of claim 4, wherein the wave damping simulation signal generator is configured to actuate the plurality of oil cylinders to waggle the main body when the main body contacts with the plurality of oil cylinders.

6. The oceaneering test platform device of claim 5, wherein each spud leg further comprises a lateral driving unit including a first driving part and a second driving part, the first driving part comprises a first sliding rail, a first sliding part and a first driving cylinder, and the second driving part comprises a second sliding rail, a second sliding part and a second driving cylinder.

7. The oceaneering test platform device of claim 6, wherein the first sliding rail is fixed to an upper end of a first spud leg part, the first sliding part is fixed to a lower end of a second spud leg part, and the first driving cylinder is fixed to the center of the second spud leg part.

8. The oceaneering test platform device of claim 7, wherein the second sliding rail is fixed to an upper end of the second spud leg part, the second sliding part is fixed to a lower end of a third spud leg part, and the second driving cylinder is fixed to the center of the third spud leg part.

9. The oceaneering test platform device of claim 8, wherein the first driving part enables lateral displacements in a first direction and the second driving part enables displacements in a second direction being perpendicular to the first direction.

10. The oceaneering test platform device of claim 9, wherein the first and second driving cylinders are hinged to a mounting stage disposed on top of the base unit, a height of the mounting stage being less than a height of the stand.

11. The oceaneering test platform device of claim 10, wherein a distance between the lower end of the third spud leg part and the base unit is less than the height of the stand.

12. The oceaneering test platform device of claim 11, wherein the lifting unit further comprises a two-way hydraulic motor, a hydraulic fluid chamber and a hydraulic controller coupling the two-way hydraulic motor to the hydraulic fluid chamber, the two-way hydraulic motor being connected to the plurality of racks.

* * * * *